United States Patent
Arndt et al.

(10) Patent No.: US 10,065,637 B2
(45) Date of Patent: Sep. 4, 2018

(54) METHOD FOR AVOIDING A COLLISION OF A VEHICLE WITH AN OBJECT

(71) Applicant: FORD GLOBAL TECHNOLOGIES, LLC, Dearborn, MI (US)

(72) Inventors: Christoph Arndt, Rheinland-Pfalz (DE); Sabine Notelaers, Limburg (BE); Helmuth Bosch, Leverkusen (DE); Peter W. A. Zegelaar, Heerlen (NL); Aaron L. Mills, Ann Arbor, MI (US); Steven Yellin Schondorf, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 84 days.

(21) Appl. No.: 15/203,523

(22) Filed: Jul. 6, 2016

(65) Prior Publication Data
US 2017/0008518 A1    Jan. 12, 2017

(30) Foreign Application Priority Data
Jul. 6, 2015    (DE) ........................ 10 2015 212 560

(51) Int. Cl.
*B60W 30/09*    (2012.01)
*G08G 1/16*    (2006.01)
(Continued)

(52) U.S. Cl.
CPC .............. *B60W 30/09* (2013.01); *B60T 7/22* (2013.01); *B60W 10/184* (2013.01);
(Continued)

(58) Field of Classification Search
CPC .... B60W 30/09; B60W 10/20; B60W 10/184; G08G 1/166; G08G 1/16; B60T 7/22;
(Continued)

(56) References Cited

U.S. PATENT DOCUMENTS 8,423,277 B2    4/2013    Shirato
8,543,261 B2 *  9/2013    Anderson ............. B60W 30/09
                                                 701/3
(Continued)

FOREIGN PATENT DOCUMENTS

DE              10231584 A1      3/2003
DE         102004056027 A1      5/2006
(Continued)

*Primary Examiner* — Jaime Figueroa
(74) *Attorney, Agent, or Firm* — Frank A. MacKenzie; Brooks Kushman P.C.

(57) ABSTRACT

A method for operating a driver assistance system (DAS) to avoid a collision of a vehicle with an object At least one object in the vehicle environment is detected by vehicle-mounted environmental sensors, and is evaluated in terms of risk of collision with the vehicle, an an automatic intervention into the vehicle movement is carried out depending on this evaluation. During the automatic intervention, the following steps are performed: 1) Carrying out an automatic braking of the vehicle depending on the evaluation of collision risk, and 2) permitting a steering intervention by the driver to perform an evasive steering maneuver, in reaction to which the automatic braking is terminated. The driver-initiated steering intervention must occur before a point-in-time at which the DAS has determined the collision cannot be avoided by steering.

20 Claims, 1 Drawing Sheet

(51) Int. Cl.
    *B60T 7/22*         (2006.01)
    *B60W 10/184*    (2012.01)
    *B62D 15/02*     (2006.01)
    *B60W 10/20*     (2006.01)

(52) U.S. Cl.
    CPC ......... *B60W 10/20* (2013.01); *B62D 15/0265* (2013.01); *G08G 1/166* (2013.01); *B60T 2201/022* (2013.01); *B60T 2220/03* (2013.01); *B60Y 2300/09* (2013.01); *G08G 1/16* (2013.01)

(58) Field of Classification Search
    CPC ........... B60T 2220/03; B60T 2201/022; B62D 15/0265; B60Y 2300/09
    USPC ..................................................... 701/1, 41
    See application file for complete search history.

(56) References Cited

U.S. PATENT DOCUMENTS

| | | | |
|---|---|---|---|
| 8,918,255 B2 | 12/2014 | Schaab et al. | |
| 9,754,325 B1* | 9/2017 | Konrardy | G06Q 40/08 |
| 2005/0060069 A1* | 3/2005 | Breed | B60N 2/2863 |
| | | | 701/408 |
| 2008/0097699 A1* | 4/2008 | Ono | B60R 21/0134 |
| | | | 701/300 |
| 2008/0306666 A1* | 12/2008 | Zeng | B60Q 9/006 |
| | | | 701/70 |
| 2008/0319610 A1* | 12/2008 | Oechsle | B60R 21/0134 |
| | | | 701/41 |
| 2012/0323477 A1* | 12/2012 | Flehmig | B60W 30/09 |
| | | | 701/301 |
| 2013/0124041 A1* | 5/2013 | Belser | B60W 30/095 |
| | | | 701/41 |
| 2014/0067252 A1* | 3/2014 | Knoop | G08G 1/167 |
| | | | 701/400 |
| 2014/0074388 A1* | 3/2014 | Bretzigheimer | B60T 1/10 |
| | | | 701/117 |
| 2014/0172226 A1* | 6/2014 | Goerick | B60W 50/0097 |
| | | | 701/28 |
| 2014/0288785 A1* | 9/2014 | Bretzigheimer | B60T 8/17558 |
| | | | 701/48 |
| 2014/0303845 A1* | 10/2014 | Hartmann | B60W 10/18 |
| | | | 701/41 |
| 2016/0311416 A1* | 10/2016 | Bretzigheimer | B60T 8/17558 |
| 2016/0339910 A1* | 11/2016 | Jonasson | G05D 1/0061 |

FOREIGN PATENT DOCUMENTS

| | | |
|---|---|---|
| DE | 102004062496 A1 | 7/2006 |
| DE | 102008040241 A1 | 1/2010 |
| DE | 1020101006215 A1 | 10/2011 |
| DE | 102011106520 A1 | 12/2011 |
| DE | 102012017628 A1 | 3/2014 |
| DE | 102013203216 A1 | 8/2014 |

* cited by examiner

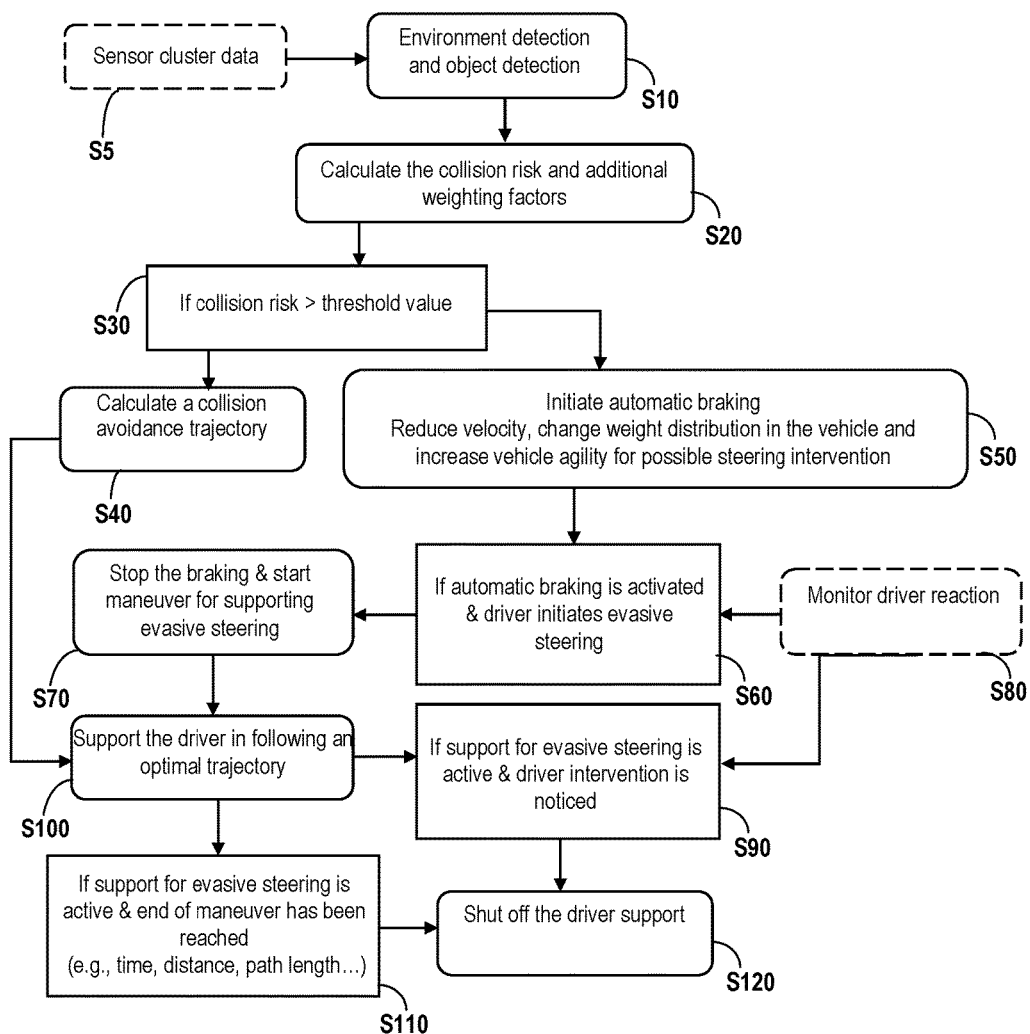

METHOD FOR AVOIDING A COLLISION OF A VEHICLE WITH AN OBJECT

CROSS-REFERENCE TO RELATED APPLICATIONS

This application claims foreign priority benefits under 35 U.S.C. § 119(a)-(d) to DE 10 2015 212 560.2 filed Jul. 6, 2015, which is hereby incorporated by reference in its entirety.

TECHNICAL FIELD

The present invention relates to a method for avoiding a collision of a vehicle with an object, and to a driver assistance system for avoiding such a collision.

BACKGROUND

Many vehicles currently on the market are equipped with different types of active safety equipment in order to support the driver in certain traffic situations. For this purpose, it is necessary to ascertain the vehicle environment and detect objects and situations. A component of corresponding safety systems, therefore, is a group of sensors for continuously monitoring the vehicle environment.

In scenarios in which a vehicle approaches an object (e.g., a foreign vehicle) located in the corresponding vehicle trajectory or lane, the functionality of automatically (without driver intervention) avoiding a collision with the relevant object can be provided. A corresponding driver assistance system (DAS) is known in the prior art and generally comprises multiple components or sub-functions.

For example, a DAS monitors the vehicle environment using one or more sensors (e.g., radar, camera, lidar), wherein map data or other sources of information such as, e.g., vehicle-to-vehicle communication, can also be used. The sensor information may then combined or fused in order to generate an environmental model, which makes it possible to calculate the path of the vehicle as well as the position of objects in the path of the vehicle. The corresponding objects are then evaluated in terms of their position and velocity relative to the intended path of the vehicle, wherein objects that are located within the intended path of the vehicle or that are approaching the path of the vehicle are classified as possible target objects for further evaluation by the DAS. After that, the relative positions, relative velocities, and sizes of the relevant target objects can be used for calculating a weighting factor (e.g., relating to the collision risk, the possibility of the collision, the time to collision, etc.) in order to provide trigger points for activating actuators in the vehicle (steering system, brakes, vehicle settings, etc.), e.g., for a steering intervention, a braking intervention, or adjusting certain vehicle parameters.

A further sub-function of a DAS is based on the reaction of the driver, wherein the manner in which the driver acts directly upon the vehicle by actuating the steering wheel or pedals (brakes, clutch, and gas pedal) is monitored. If the driver reaction ascertained on the basis of the available driver-monitoring sensors indicates a maneuver for collision avoidance, a trigger signal for activating actuators in the vehicle for collision avoidance can also be generated.

A further sub-function of a DAS is based on the dynamic vehicle state of the particular vehicle equipped with the system according to the invention. Known vehicle sensors, e.g., for measuring the vehicle velocity, the yaw rate, and the lateral acceleration, determine the dynamic state of the vehicle. In this case, the activation for collision avoidance can be limited, in particular, to a certain velocity range.

A further sub-function of a DAS includes the calculation of a suitable collision avoidance path or an alternative route. In this case, the linked environmental and object information is used for calculating a suitable path for collision avoidance or for an evasive maneuver. Such a calculation of one or more alternative routes can be carried out using splines, logic functions, or polynomials, as is well known in the art. The basic conditions that apply in this case include collision avoidance with a target vehicle or foreign vehicle, and physical limits such as, e.g., a maximum lateral acceleration, friction, vehicle parameters, etc. In this case, either a suitable alternative route can be selected from a group of vehicle paths (and with consideration for further optimization criteria) or a single alternative route can be determined from the beginning as the optimal vehicle path based on the basic conditions.

A further sub-function relates to the control of one or more actuators or a combination of actuators. The actuators utilized for collision avoidance are typically steering system components and brakes. However, certain vehicle parameters or settings such as, e.g., the settings of a spring-and-shock absorber system and the setting of a steering ratio for supporting a collision avoidance maneuver may also be adjusted as necessary.

In addition, it is known to provide the driver with the opportunity to maintain complete control over the vehicle by disabling the activated collision avoidance system or DAS.

DE 10 2011 106 520 A1 discloses, inter alia, a method for avoiding a collision of a vehicle and a driver assistance system for a vehicle, wherein the actuation of the brake pedal is continuously detected, wherein a collision risk is deduced when the brake pedal is rapidly actuated. Furthermore, the position and movement of objects in the vehicle environment are detected and evaluated in terms of the collision risk. If a collision risk is identified, an evasive maneuver of the vehicle is automatically carried out when the evaluation of the collision risk reveals that a collision can be avoided by means of an evasive maneuver, but not by means of a braking maneuver.

DE 10 2004 056 027 A1 discloses a method and a vehicle assistance system for avoiding collisions or for reducing the collision severity of a vehicle, wherein the assistance system carries out an automatic steering- and/or braking intervention on the basis of the evaluation of the present and future position of objects relative to the vehicle when, according to the evaluation, a collision with an object is unavoidable without an intervention into the system.

Reference is made to DE 10 2008 040 241 A1, DE 10 2010 006 215 A1, U.S. Pat. No. 8,918,255 B2, U.S. Pat. No. 8,423,277 B2, DE 10 2012 017 628 A1 and DE 10 2004 056 027 A1 as the further prior art.

SUMMARY

A method is disclosed herein for avoiding a collision of a vehicle with an object, wherein at least one object located in the vehicle environment is detected in a sensor-supported manner and is evaluated in terms of risk of collision with the vehicle, wherein an automatic intervention into the vehicle movement is carried out depending on this evaluation, includes the following steps:
  carrying out an automatic braking of the vehicle depending on the evaluation in terms of collision risk; and
  permitting a steering intervention by the driver for the purpose of carrying out an evasive steering maneuver, wherein, in the case of a steering intervention carried out by the driver, the automatic braking is terminated.

The above method is based on the concept of first initiating an automatic braking of the vehicle in the event of a determined risk of collision with an object such as, e.g., a foreign vehicle, but also providing the driver with the opportunity to terminate this automatic braking and avoid a collision by carrying out a steering intervention. This driver steering intervention can be supported or assisted by the driver assistance system (DAS) according to the disclosure. According to the disclosure, an automatic evasive maneuver is not initiated by the DAS, but rather the DAS provides steering inputs in support of the driver-initiated evasive maneuver.

The automatic braking, which is initially initiated by the DAS, has the advantage that the velocity of the vehicle is initially reduced, thereby providing for a gentler or more gradual motion path or trajectory for the evasive maneuver when it is initiated by the driver. In addition, the weight distribution of the vehicle is changed, whereby the agility or maneuverability of the vehicle is increased in terms of the steering intervention by the driver.

According to the disclosure, two measures are therefore combined: One of these measures is automatic braking initiated by a DAS which, firstly, effectuates a change in the load distribution and improves the agility or maneuverability or steering response of the vehicle and, secondly, reduces the vehicle velocity. Automatic braking is preferably activated when the collision probability or the level of danger exceeds a predetermined threshold value. The evaluation of the vehicle environment has already been carried out before any evasive maneuver is carried out.

The second of the aforementioned two measures is that any evasive maneuver must be initiated by the driver himself, as necessary, whereby the responsibility for the evasive steering maneuver is transferred to the driver.

According to one embodiment, in the case of a steering intervention carried out by the driver, an automatic DAS steering input is provided to assist the evasive steering maneuver carried out by the driver. This automatic steering input is carried out in such a way that the act of the vehicle following a defined collision avoidance trajectory, as defined and initiated by the driver, is supported or assisted.

According to one disclosed embodiment, a calculation of the collision avoidance trajectory is carried out depending on the evaluation in terms of the collision risk before the automatic support of the evasive steering maneuver carried out by the driver.

According to one disclosed embodiment, the automatic support or assistance of the evasive steering maneuver carried out by the driver is terminated when the driver disables or terminates the evasive steering maneuver by means of a steering and/or braking intervention.

In another advantageous disclosed embodiment, the intensity or nature of the automatic steering support and/or braking support provided by the DAS depends on the collision risk. In this case, both the braking intervention as well as the steering intervention can be carried out that much more intensively, depending on how critical a situation is determined to be and the greater the collision risk is.

Advantageously, the intensity or nature of the steering support and/or the braking support depends on the vehicle velocity. In the case of elevated velocities, the intervention can be less, so that the vehicle remains stable.

Preferably, the stability of the vehicle is controlled during the braking and/or steering maneuver by means of an electronic stability control (ESC) system (of a type well known in the pertinent art) present in the vehicle. As a result, it is ensured that the vehicle can still be controlled in all situations, in particular in the event of roads being slippery due to wetness or ice.

The disclosure further relates to a driver assistance system, wherein, in order to avoid a collision of a vehicle with an object, at least one object located in the vehicle environment can be detected in a sensor-supported manner and can be evaluated in terms of the collision risk and, wherein, depending on this evaluation, an automatic intervention into the vehicle motion can be carried out, wherein the driver assistance system is configured for carrying out a method having the above-described features. With respect to advantages and preferred embodiments of the driver assistance system, reference is made to the comments presented above in the context of the method according to the disclosure.

The invention is explained in greater detail in the following on the basis of an exemplary embodiment and with reference to the attached drawing.

BRIEF DESCRIPTION OF THE DRAWINGS

FIG. 1 shows a flow chart depicting a typical mode of operation of an embodiment of the disclosed driver assistance system and/or a sequence of an embodiment of the disclosed method.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

According to FIG. 1, in the step S10, the driver assistance system (DAS) according to the invention continuously monitors various aspects of the vehicle and its environment, including objects located in the vehicle environment, the driver actions, and the vehicle state on the basis of sensor data available from known types of vehicle sensors (S5). The objects in the vehicle environment are classified in terms of the path of the vehicle. If an object is detected in the path of the vehicle, the collision probability is evaluated. The time to collision (TTC) is calculated, and weighting factors in terms of the collision probability are determined for the system activations (step S20).

If the collision probability exceeds a predetermined threshold value (step S30), the system automatically activates the brakes in step S50 in order to reduce the velocity of the vehicle, change the weight distribution of the vehicle, and increase the vehicle agility or maneuverability in the event that the driver wants to carry out an evasive steering maneuver.

In addition to the automatic brake activation in step S50, a suitable motion path or collision avoidance trajectory for an evasive maneuver of the vehicle may be calculated (step S40). In addition, the driver reaction is monitored (step S80) using onboard sensors which monitor the driver's control inputs, such as steering and/or braking. Upon or during automatic braking, if a steering intervention is carried out by the driver (for example, by way of the driver aggressively steering, e.g., by more than a predefined angle or by more than a predefined angle per second, (step S60), the DAS terminates the braking intervention (step S70) and begins providing steering inputs to guide or assist the driver through the evasive steering maneuver. This steering assistance may be provided by way of a steering torque being applied to the steering wheel, which torque is calculated on the basis of the optimal motion path or trajectory (step S100). In the case of different possible settings of the actuators, the evasive maneuver can also be supported by the brakes, in which case the act of following the motion path or the trajectory is supported while the maneuver is carried out.

If the driver disables the evasive maneuver (step S90) by means of a steering- and/or braking intervention upon or during the execution of an evasive steering maneuver, the automatic DAS support/assistance for the evasive maneuver is shut off and terminated (step S120). The automatic DAS support for the evasive maneuver is also shut off if the end of the maneuver has been reached after step S100.

Automatic braking and driver-initiated collision avoidance by means of steering intervention can be carried out in succession only until the last point-in-time for a successful steering intervention has been reached. As soon as this point-in-time has been reached or exceeded, the automatic braking is continued (as having not been terminated), in which case the driver is no longer capable of carrying out a steering intervention for an evasive maneuver.

The present disclosure includes the concept of automatic braking of the vehicle being activated by the DAS when a predetermined threshold value for the collision risk has been exceeded, wherein the corresponding braking intervention can include full braking or even partial braking. Moreover, a manual steering intervention can be carried out by the driver and an evasive steering maneuver can be carried out if the automatic brake intervention has already been activated.

In embodiments, the driver can disable or work with the DAS when, e.g., the driver decides that he does not want to follow the motion path or trajectory. At the end of the maneuver or when a disabling by the driver is detected, the driver support provided by the DAS is gradually or gently shut off.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for operating a driver assistance system of a vehicle to avoid a collision, comprising:
   operating a sensor to detect an object;
   determining that a risk of collision with the object exceeds a threshold;
   beginning automatic braking;
   monitoring control inputs by the driver; and
   in reaction to a steering intervention by the driver to execute an evasive steering maneuver, terminating the automatic braking and making a steering input assisting the evasive steering maneuver.

2. The method of claim 1, further comprising:
   terminating the automatic braking only if the steering intervention is made prior to a point-in-time at which collision with the object is determined by the driver assistance system to be unavoidable by the evasive steering maneuver.

3. The method of claim 1, wherein the steering input is based at least in part on a collision avoidance trajectory calculated by the driver assistance system.

4. The method of claim 3, further comprising terminating the steering input in response to the driver making a further steering and/or braking intervention that conflicts with the collision avoidance trajectory.

5. The method of claim 1, wherein the steering input is based at least in part on a level of the collision risk.

6. The method of claim 1, wherein the steering input is based at least in part on a vehicle velocity.

7. The method of claim 1, further comprising further assisting the evasive steering maneuver by making a braking input.

8. A method for operating a driver assistance system of a vehicle to avoid a collision, comprising:
   operating a sensor to detect an object in a vehicle environment;
   determining that a risk of collision with the object exceeds a threshold;
   beginning automatic braking to slow the vehicle;
   monitoring control inputs by the driver; and
   upon detection of a driver steering intervention to execute an evasive steering maneuver prior to a point at which collision with the object is unavoidable by steering, terminating the automatic braking and making a steering input assisting the evasive steering maneuver.

9. The method of claim 8, wherein the steering input is based at least in part on a collision avoidance trajectory calculated by the driver assistance system.

10. The method of claim 9, further comprising terminating the steering input in response to the driver making a further steering and/or braking intervention that conflicts with the collision avoidance trajectory.

11. The method of claim 8, wherein the steering input is based at least in part on a level of the collision risk.

12. The method of claim 8, wherein the steering input is based at least in part on a vehicle velocity.

13. The method of claim 8, further comprising further assisting the evasive steering maneuver by making a braking input.

14. A method for operating a driver assistance system of a vehicle to avoid a collision with an object detected by sensors, comprising:
   braking the vehicle in response to a risk of collision with the object reaching a threshold;
   terminating braking in response to detection of a steering intervention by the driver to avoid colliding with the object; and
   applying a steering input assisting the steering intervention.

15. The method of claim 14, further comprising:
   terminating braking only if the steering intervention is made prior to a point-in-time at which collision with the object is determined by the driver assistance system to be unavoidable by an evasive steering maneuver.

16. The method of claim 14, wherein the steering input is based at least in part on a collision avoidance trajectory calculated by the driver assistance system.

17. The method of claim 16, further comprising terminating the steering input in response to the driver making a further steering and/or braking intervention that conflicts with the collision avoidance trajectory.

18. The method of claim 14, wherein the steering input is based at least in part on a level of the collision risk.

19. The method of claim 14, wherein the steering input is based at least in part on a vehicle velocity.

20. The method of claim 14, further comprising further assisting the steering intervention by making a braking input.

* * * * *